United States Patent [19]
Murakami

[11] Patent Number: 4,712,134
[45] Date of Patent: Dec. 8, 1987

[54] IMAGE READER WITH PLURAL PICKUP ELEMENTS READING OVERLAPPING IMAGE REGIONS OF AN ORIGINAL IMAGE

[75] Inventor: Shigeo Murakami, Fushimi, Japan

[73] Assignee: Dainippon Screen Mfg. Co., Ltd., Kyoto, Japan

[21] Appl. No.: 865,985

[22] Filed: May 21, 1986

[30] Foreign Application Priority Data

May 31, 1985 [JP] Japan ................... 60-119348

[51] Int. Cl.$^4$ ................ H04N 3/14; H04N 1/415
[52] U.S. Cl. ................ 358/213.13; 358/213.28; 358/285; 358/294
[58] Field of Search ............ 358/213, 293, 294, 285, 358/226

[56] References Cited

U.S. PATENT DOCUMENTS

| | | | |
|---|---|---|---|
| 4,005,285 | 1/1977 | Price ........................... | 358/294 |
| 4,200,788 | 4/1980 | Agulnek ...................... | 358/293 |
| 4,249,217 | 2/1981 | Korte et al. ................. | 358/294 |
| 4,321,628 | 3/1982 | Crean .......................... | 358/293 |
| 4,432,022 | 2/1984 | Tokumitsu ................... | 358/293 |
| 4,449,151 | 5/1984 | Yokota et al. ............... | 358/294 |
| 4,467,365 | 8/1984 | Murayama et al. .......... | 358/293 |
| 4,532,551 | 7/1985 | Kurata et al. ................ | 358/293 |

*Primary Examiner*—Gene Z. Rubinson
*Assistant Examiner*—Stephen Brinich
*Attorney, Agent, or Firm*—Lowe, Price, LeBlanc, Becker & Shur

[57] ABSTRACT

In reading of the original by a plurality of image pickup elements, the image is read by the image pickup elements covering overlapping image regions. Among those located within the overlapping portions, a pixel having small density change values with respect to adjacent pixels is detected and specified as a switching pixel. The image pickup signals read by the image pickup elements are connected at the switching pixels, thereby to obtain a reproduced image.

6 Claims, 16 Drawing Figures

FIG. 1
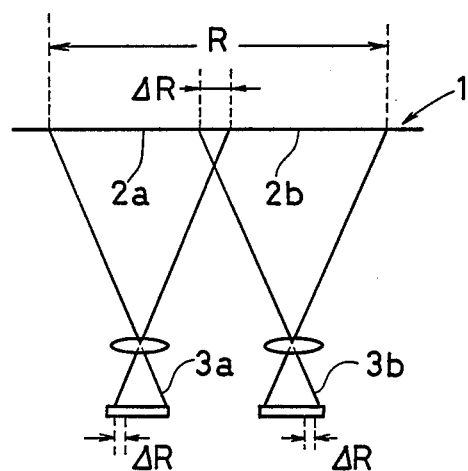
FIG. 4
PRIOR ART
(a)
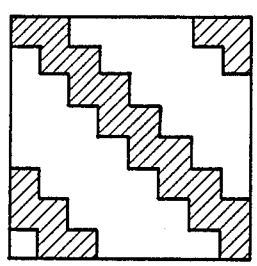
(b) SWITCHING POSITION
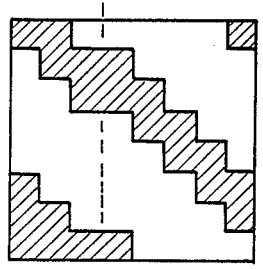
(c) SWITCHING POSITION
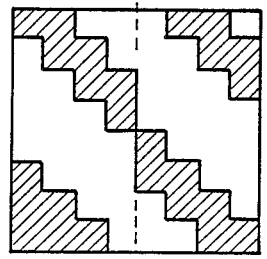

(a) (b)

(a) MAIN SCANNING DIRECTION  $l_1$  SUB-SCANNING DIRECTION (b) MAIN SCANNING DIRECTION  $l_2$  SUB-SCANNING DIRECTION (a) $\Delta R$  (b) $\Delta R$  $C_1$

IMAGE READER WITH PLURAL PICKUP ELEMENTS READING OVERLAPPING IMAGE REGIONS OF AN ORIGINAL IMAGE

BACKGROUND OF THE INVENTION

1. Field of the Invention

The present invention relares to an image reader which employs a plurality of image pickup elements such as CCD line sensors thereby to read image data along each scanning line.

2. Description of the Prior Art

An image reader used in the field of, e.g., process printing is required to be remakably excellent in image reproducibility, and hence it is necessary to read images through image pickup element which is assembled by extremely large numbers of unit elements. However, only a limited number of such unit elements can be assembled in a single image pickup element in the present state of art. Therefore, such a system as hereafter descried is employed in these fields.

In this system, as shown in FIG. 1, a read range R of an original 1 in the main scanning direction is split into a plurality of sections 2a and 2b, so that image data in the respective sections 2a and 2b are read by a plurality of line sensors 3a and 3b. Then the data are so connected as to obtain a reproduced image. Shch a system is hereinafter referred to as "split read system". In this system, it is substantially impossible to perform mutual arrangement of the line sensors 3a and 3b in the units of pixels (e.g., 7 $\mu \times 7\mu$), and hence portions shown by $\Delta R$ in FIG. 1 are overlappingly read by the two line sensors 3a and 3b. As shown in FIG. 2, the line sensors 3a and 3b are switched at the positions of specific pixels (i-th pixels in the case of FIG. 2) corresponding to the overlapping portions $\Delta R$, thereby to connect the image data.

However, it is difficult to perform relative arrangement of the line sensors 3a and 3b as hereinabove described and the relative positions thereof are secularly changed, whereby the i-th pixel overlaps with an (i+1)-th pixel by, e.g., ½ pixel as shown in FIG. 3. Thus, data for a pixel included in the original may appear in two pixels in the reproduced image. FIG. 4 is an enlarged view of images for illustrating such states. When read pixels overlap with each other in connection of image data for an original as shown at (a) in FIG. 4, the reproduced image is irregulated as shown at (b). If the read pixels are defaulted, the reproduced image is also irregulated as shown at (c). In the split read system, sub-scanning is performed by changing relative positional relation between the original 1 and the line sensors 2a and 3b, and hence, when originals as shown in FIG. 5 are reproduced, overlapping and defaulted portion are arrayed along straight lines $l_1$ and $l_2$ extending in the sub-scanning direction as shown in FIG. 6. It is to be noted that these portions are discontinuously illustrated in FIG. 6 for easy understanding of such disadvantage. Thus, such irregularity of the image is easily visualized in the above described system.

In order to cope with the disadvantage, Japanese Patent Laying-Open Gazette No. 9168/1982 proposes a technical idea of composing outputs from the line sensors 3a and 3b in a proportional distribution manner for reproducing the overlapping portions $\Delta R$. In Japanese Patent Laying-Open Gazette No. 9167/1982, further, switching positions of the two line sensors 3a and 3b are arranged at random in the sub-scanning direction on the basis of random numbers, thereby to prevent linear irregularity of the image. However, both of such processes are performed with no regard to the contents of original images, and hence switching cannot be performed in correspondence to characteristics of the originals. When, particularly in the former case, border lines etc. included in the originals are present in the overlapping portions $\Delta R$, such border lines are inevitably blurred.

SUMMARY OF THE INVENTION

The present invention is directed to an image reader for reading image data of the originals. According to the present invention, the image reader comprises a plurality of image pickup elements for reading image data of the originals partially overlappingly in a split manner to provide image pickup signals; density change detecting a pixel having small spatial density changes with respect to adjacent pixels from pixels belonging to the overlapping portions on the basis of the image pickup signals from the image pickup elements and specifying the detected pixel as a switching pixel; and image pickup signal connecting means for connecting respective image pickup outputs supplied from the plurality of image pickup elements at the switching pixel and outputting the connected image signals to desired image processing system.

Namely, switching is performed at the pixel having small density changes in the overlapping portions, thereby to connect a plurality of image pickup signals.

Accordingly, an object of the present invention is to provide an image reader which varies switching positions between image pickup elements with characteristics of originals in the split read system, thereby to reduce visualization of irregularity in reproduced image.

There and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing the concept of a split read system;

FIGS. 4a–4c are enlarged views of images showing irregularity in reproduced image;

DESCRIPTION OF THE PREFERRED EMBODIMENTS

FIRST EMBODIMENT

A. Entire Structure

Figure 7:
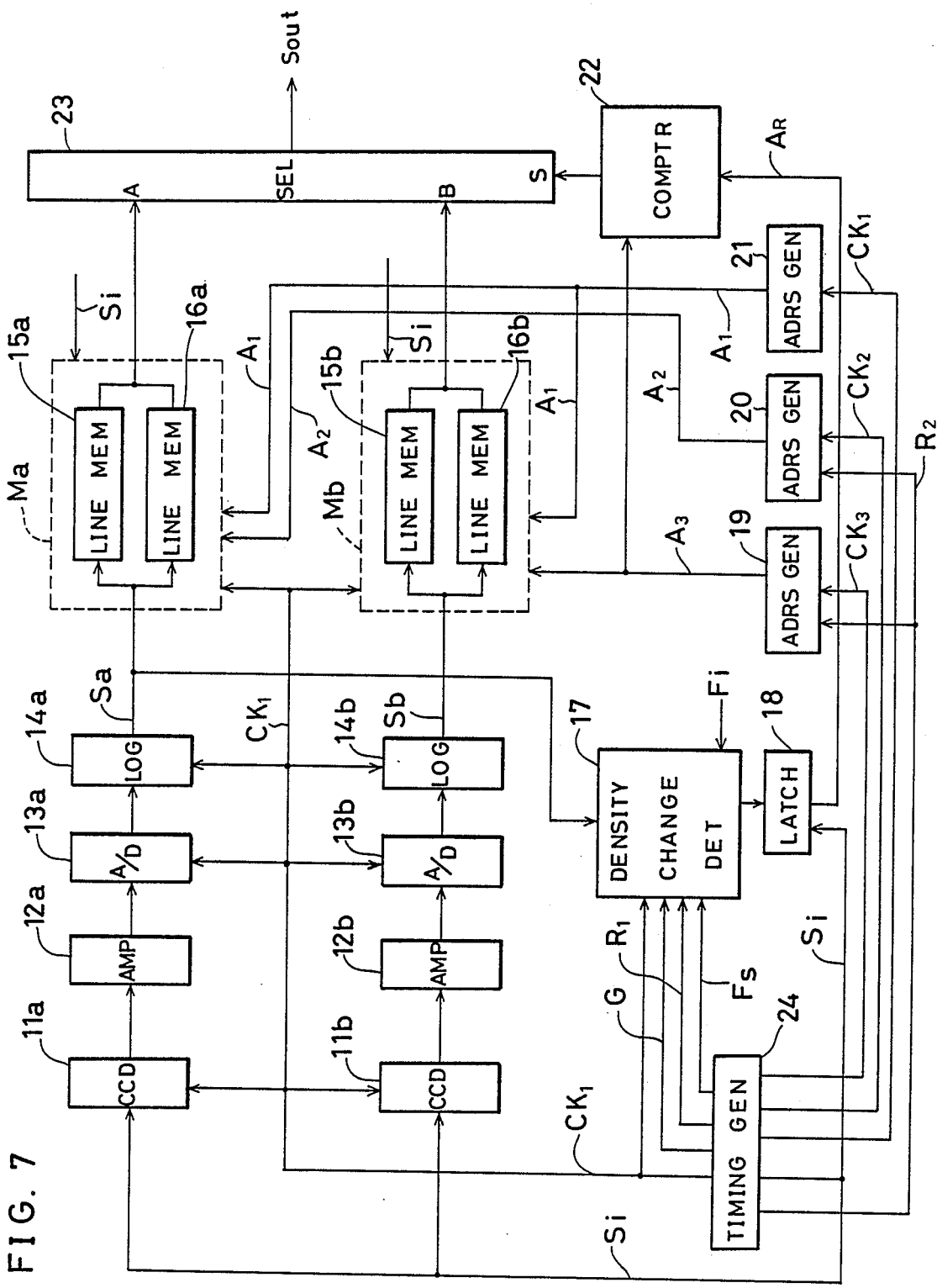
FIG. 7 is a block diagram showing the electric structure of a first embodiment of the present invention.
Figure 8:
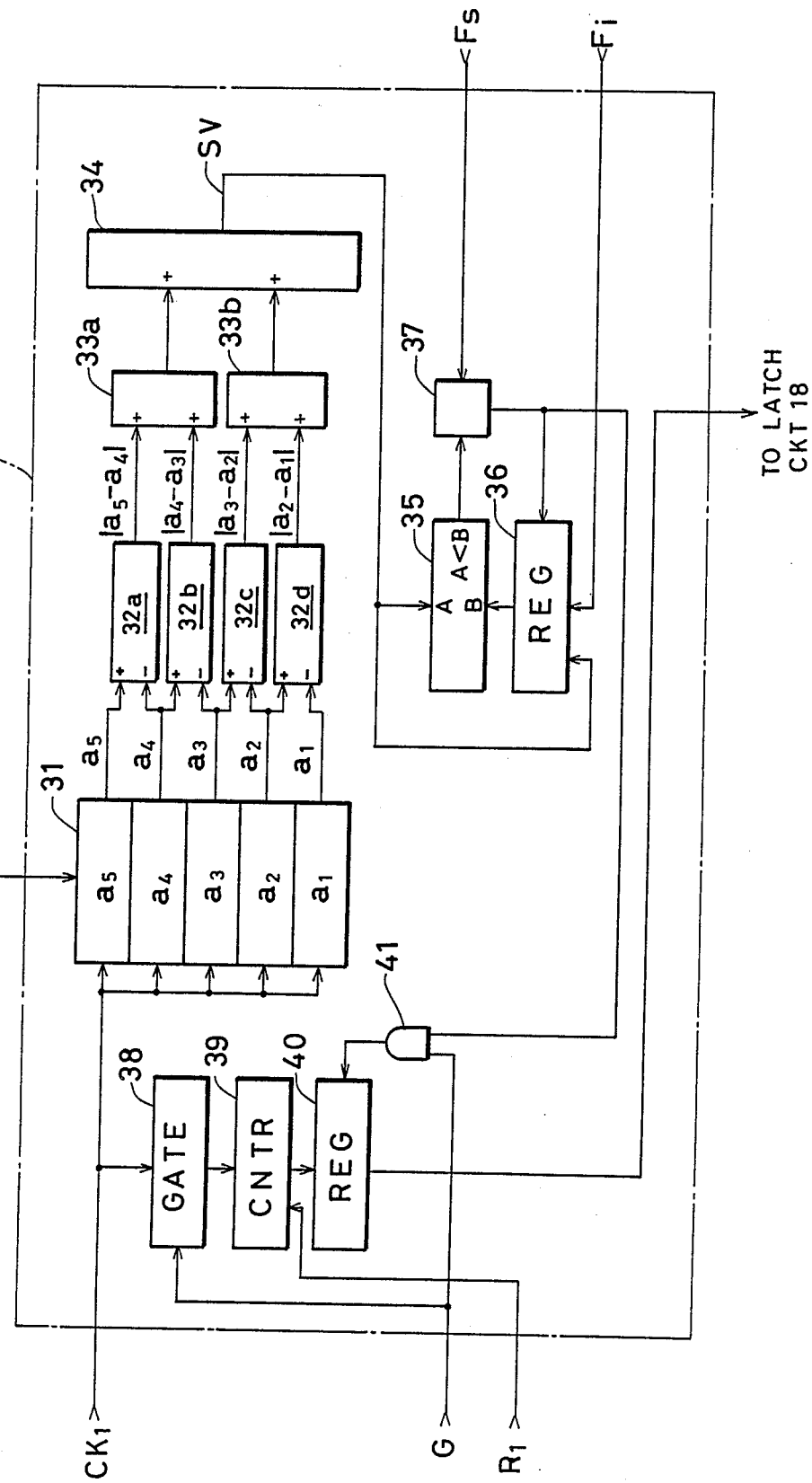
FIG. 8 is a block diagram showing a density change detector in the first embodiment in datail.
Figure 9:
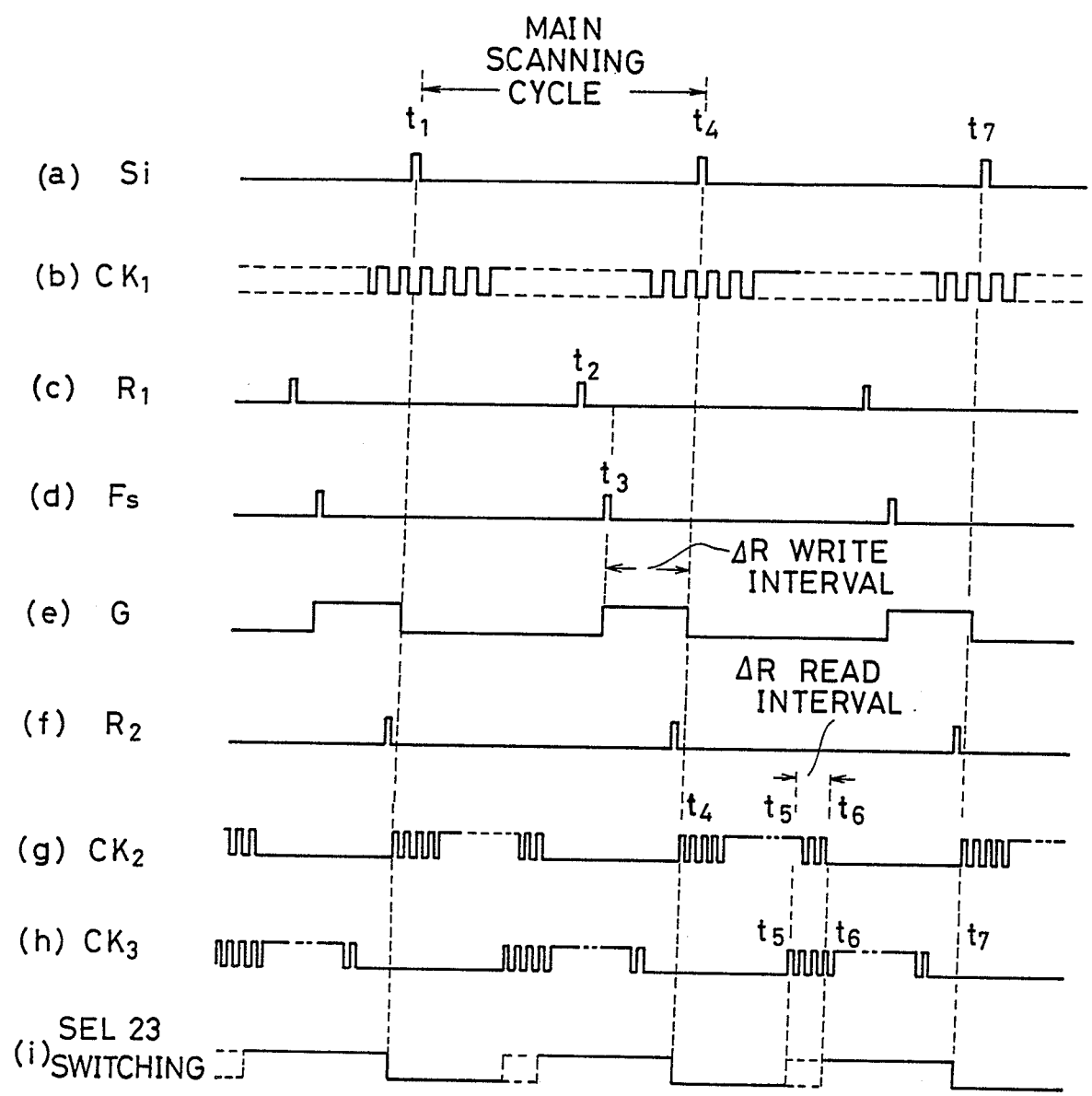
FIG. 9 is a timing chart showing the operation of the first embodiment.

FIG. 7 is block diagram showing the circuit suructure of an image reader according to a first embodiment of the present invention. FIG. 8 is a diagram showing the internal structure of a density change detector 17 provided in the circuit as shown in Fin. 7 in compliance with the feature of the present invention. Description is now made on the structure and the operation of the first embodiment with reference to there drawings and a timing chart as shown in FIG. 9.

Referring to FIG. 7, the image reader according to the present embodiment is provided with two CCD line sensors 11a and 11b for performing split reading of the original. Image pickup signals from the line sensors 11a and 11b are temporarily stored in memory blocks Ma and Mb respectively, to be connected with each other at the switching pixel in a series manner by a selector 23. The switching pixel is specified as the pixel having the minimum density change value detected by the density change detector 17. Reproduced image signals $S_{out}$ obtained by such connection are outputted to a desired image processing system (not shown). Such operation is hereafter described in sequence.

B. Reading and Stotage of the Original

Figure 10:
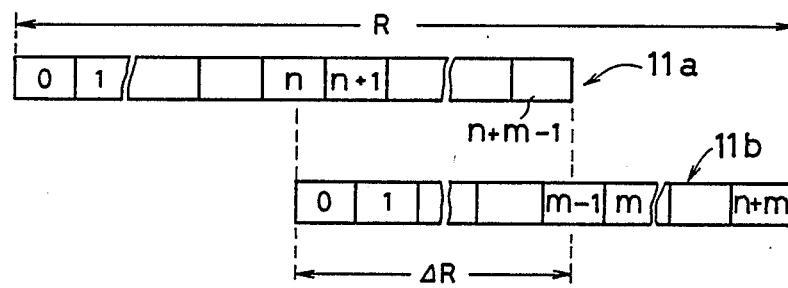
FIG. 10 is a diagram illustrating overlap reading in the embodiment of the present invention.

In order to read the original, first provided is the pulse of a start signal clock $S_i$ (FIG. 9(a)) for designating a main scanning cycle. At this time $t_1$, the line sensors 11a and 11b start reading image data of corresponding sections within a read range R in the main scanning direction as shown in FIG. 10. An overlapping portion $\Delta R$ having a number m of pixels between n-th pixel and (n+m−1)-th pixel is doubly read by both of the line sensors 11a and 11b. Such read timing is designated by clock signal $CK_1$ (FIG. 9(b)) generated by a timing signal generator 24.

The image data read in parallel by the line sensors 11a and 11b are respecyively amplified by analog amplifiers 12a and 12b as shown in FIG. 7, to be A/D converted by A/D converters 13a and 13b. Digital signals thus obtained are logarithmically transformed by LOG transformers 14a and 14b, to provide image pickup signals Sa and Sb which are approximate to relative luminosity. These image pickup aignals Sa and Sb are alternately written per main scanning cycle in two line memories 15a and 16a included in the memory block Ma and two line memories 15b and 16b included in the memory block Mb respectively. Thus, assuming that the line memories 15a and 15b are selected for writing in the cycle started at the time $t_1$, the image pickup signals Sa and Sb are written in the line memories 15a and 15b respectively. Such write timing and writing address are designated by the clock signal $CK_1$ and a write address signal $A_1$ from write address generator 21 respectively.

C. Detection of Density Changes

On the other hand, the image pickup signal Sa is supplied to the density change detector 17, which is adapted to detect spatial density changes in the pixel array. The density change detector 17 is shown in detail in FIG. 8. Referring to FIG. 8, the image pickup signal Sa is first supplied to a five-stage shift register 31. The shift register 31 can store density data $a_1$ to $a_5$ for respective pixels in respective unit registers, which sequentially transfer the density data to subsequent unit registers in response to the clock signal $CK_1$. Adjacent pairs of these density data are respectively supplied to subtractors 31a to 31d. Each one of the subtractors 31a to 31d obtains a signal expressing the absolute value of difference between the inputted pair of data, thereby to output the same. The signals thus obtained are added up through adders 33a, 33b and 34 to produce a signal $S_v$. Thus, the value of the signal $S_v$ is expressed as follows:

$$S_v = |a_5 - a_4| + |a_4 - a_3| + |a_3 - a_2| + |a_2 - a_1| \tag{1}$$

Therefore, with respect to a pixel having a density data $a_3$ (hereinafter simply referred to as "pixel $a_3$"), the signal $S_v$ expresses the state of the density change between the said pixel $a_3$ and two pairs of pixels ($a_1$, $a_2$) and ($a_4$, $a_5$) adjacent thereto.

The signal $S_v$ thus obtained is supplied as an A input to a comparator 35. The comparator 35 is adapted to compare the signal $S_v$ (A input) with a B input from a register 36, to supply its output to a one-shot generator 37 only when the A input is smaller that the B input. In response to this, the one-shot generator 37 generates a one-shot pulse to supply the same to the register 36, which in turn fetches the signal $S_v$ to update its content.

On the other hand, the one-shot generator 37 is supplied with a density change initial value fetch pulse $F_s$ at a time $t_3$ (FIG. 9(d)), from which the line sensor 11a starts transferring pixels belonging to the overlapping portion $\Delta R$. In response to this, the one-shot genersor 37 generates a one-shot pulse to supply the same to the register 36. In response to this, the register 36 fetches a density change initial value $F_i$, which is such a maximum value that the respective bits of the register 36 become "1".

Thus, the register 36 fetches the initial value at the time $t_3$, and thereafter the content thereof is updated every time reading of the overlapping portion $\Delta R$ is advanced to find a smaller density change value. Therefore, the register 36 holds the minimum density change value in the overrapping portion $\Delta R$ when reading is completed. In other words, this circuit detects the minimum density change value by mutual comparison of density change values of respective regions in the overlapping portion $\Delta R$.

D. Specification of Switching Pixels

The density change detector 17 includes a gate circuit 38, a counter 39 and a register 40, which are adapted to detect which address of the line memory 15b store the pixel having the minimum density change value.

A gate signal G received in the gate circuit 38 is adapted to gate the clock signal $CK_1$ in an interval between an n-th pulse of the clock signals $CK_1$ from the time $t_1$ and an (n+m−1)-th pulse (FIG. 9(e)), whereby the gated clock signal $CK_1$ is supplied to the counter 39. The interval corresponds to an interval for writing the overlapping portion $\Delta R$ in the line memory 15a.

The counter 39 is reset by a reset signal $R_1$ at a time $t_2$ slightly ahead of a rise time $t_3$ of the gate signal G (FIG. 9(c)). Therefore, the counter 39 counts the clock signal $CK_1$ after an (n+1)-th pulse. At this count start time $t_3$, the unit register $a_3$ holds an n-th pixel, i.e., the first pixel in the overlapping portion $\Delta R$. Thus, the count values of the counter 39 indicate the numbers of the pixels in the overlapping portion $\Delta R$. The counter 39 supplies the count values thus obtained to the register 40 in the subsequent stage.

Figure 11:
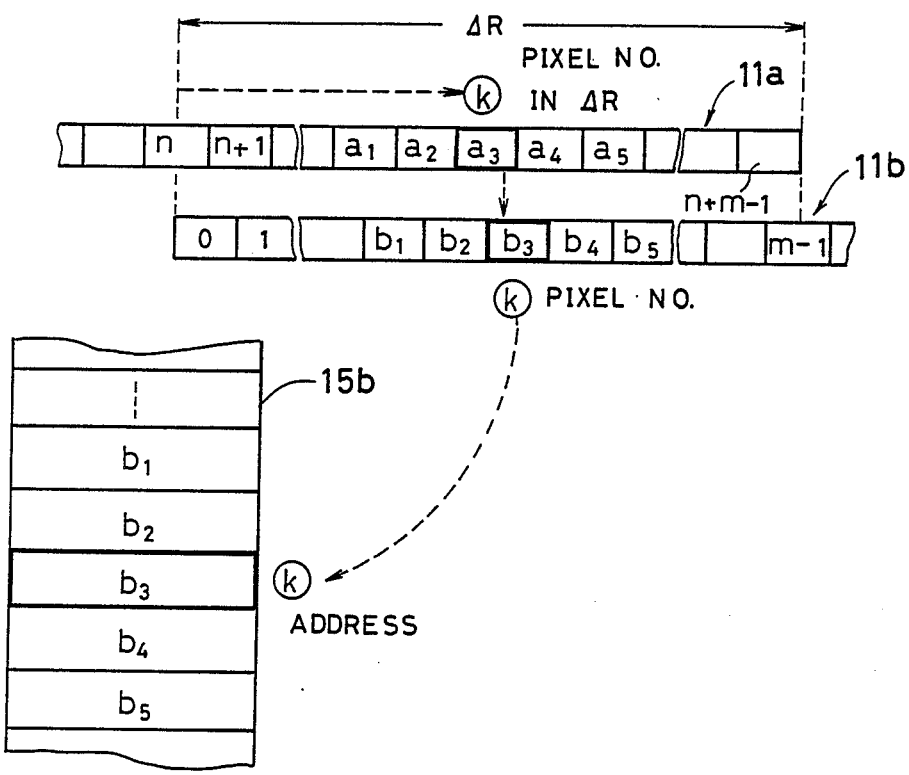
FIG. 11 is a diagram for illustrating pixel numbers of switching pixels.

Thus, the register 40 receives the value indicating the pixel number k of the pixel $a_3$ in the overlapping portion ΔR as shown in FIG. 11. The pixel nimber k also serves as a data indicating which address of the line memory 15b stores a pixel b3 corresponding to the pixel a3 within the pixels read by the other line sensor 11b.

As hereinabove described, the one-shot generator 37 generates a one-shot pulse every time a smaller density value is detected. This pulse is inputted with the gate operation signal G (FIG. 9(e)) of the gate circuit 38 in an AND circuit 41, the AND output of which is supplied to the register 40. The register 40 fetches the input from the counter 39 only when the said AND output is supplied. Thus, the content held in the register 40 upon completion of writing of the overlapping portion ΔR in the memory 15a indicates the address of the line memory 15b storing the pixel having the minimum density change value in the overlapping portion ΔR. This signal is latched by the clock $S_l$ in the latch circuit 18 as shown in FIG. 7, to be employed as data for specifing switching pixels for connecting the image pickup signals in a subsequent main scanning cycle.

F. Connection of Image Pickup Signals

Description is now made on the operation of connecting the image pickup signals. The image pickup signals written in the line memories 15a and 15b in the cycles of the times $t_1$ to $t_4$ are read in the cycles of subsequent times $t_4$ to $t_7$. Such reading address is obtained by counting read clock signals $CK_2$ and $CK_3$ (FIG. 9(g) and (h)) in the following manner, each of which are twice clock signal $CK_1$ in frequency and overlapping with each other by the interval for reading the overlapping portion ΔR:

Address designation in reading from the line memory 15a is performed on the basis of an output $A_2$ of a read address generator 20 as shown in FIG. 7, while reading from the line memory 15b is performed on the basis of an output $A_3$ of another address generator 19. The address generators 19 and 20 generate address signals by resetting addresses by a reset signal $R_2$ (FIG. 9(f)) and respectively counting the clock signals $CK_2$ and $CK_3$. Therefore, the respective storage contents of the line memories 15a and 15b are read in time relation similar to positiomal relation as shown in FIG. 10, to be outputted to the selector 23.

A comparator 22 as shown in FIG. 7 compares an address $A_R$ latched by the aforementioned latch circuit 18 with the address output $A_3$ of the read address generator 19. When $A_3 < A_R$, the comparator 22 makes the selector 23 select its A input, which is outputted as the reproduced image signal $S_{out}$. When the read address $A_3$ from the line memory 15b is matched with the latched address, i.e., when $A_3 \leq A_R$, the comparator 22 supplies a switching signal to the selector 23, which in turn outputs its B input as the reproduced image signal $S_{out}$ thereafter.

Such timing is shown at FIG. 9(i), and the said switching is performed at a time in the interval between $t_5$ and $t_6$ for reading the overlapping portion ΔR. Thus, attained is connection of the two image pickup signals Sa and Sb at the pixel having the minimum density value as switching pixel.

In the interval from $t_1$ to $t_4$ in FIG. 9, reading from the line memories 16a and 16b and writing in the line memories 15a and 15b are respectively performed in parallel with the aforementioned operation, and thus maintained is alternate operation with respect to the two pairs of line memories. Such operation is repeated every time a scanning mechanism (not shown) scans the original.

Second Embodiment

Descrition is now made on a second embodiment, which is not shown in the drawings. The second embodiment is so structured that the register 36 (FIG. 8) in the first embodiment continusly holds a predetemined density change refernce value. Such reference value may be fixed, or set for each original. Every time a densiy change value smaller than the reference value is detected, the address of a corresponding thereto is specified in this case. The register 40 as shown in FIG. 8 is replaced by a memory for storing all of the specified addresses, and one of them is selected as a switching pixel through a random number, similarly to the Japanese Patent Laying-Open Gazette No. 9167/1982 as hereinabove described.

Third Embodiment

Figure 12:
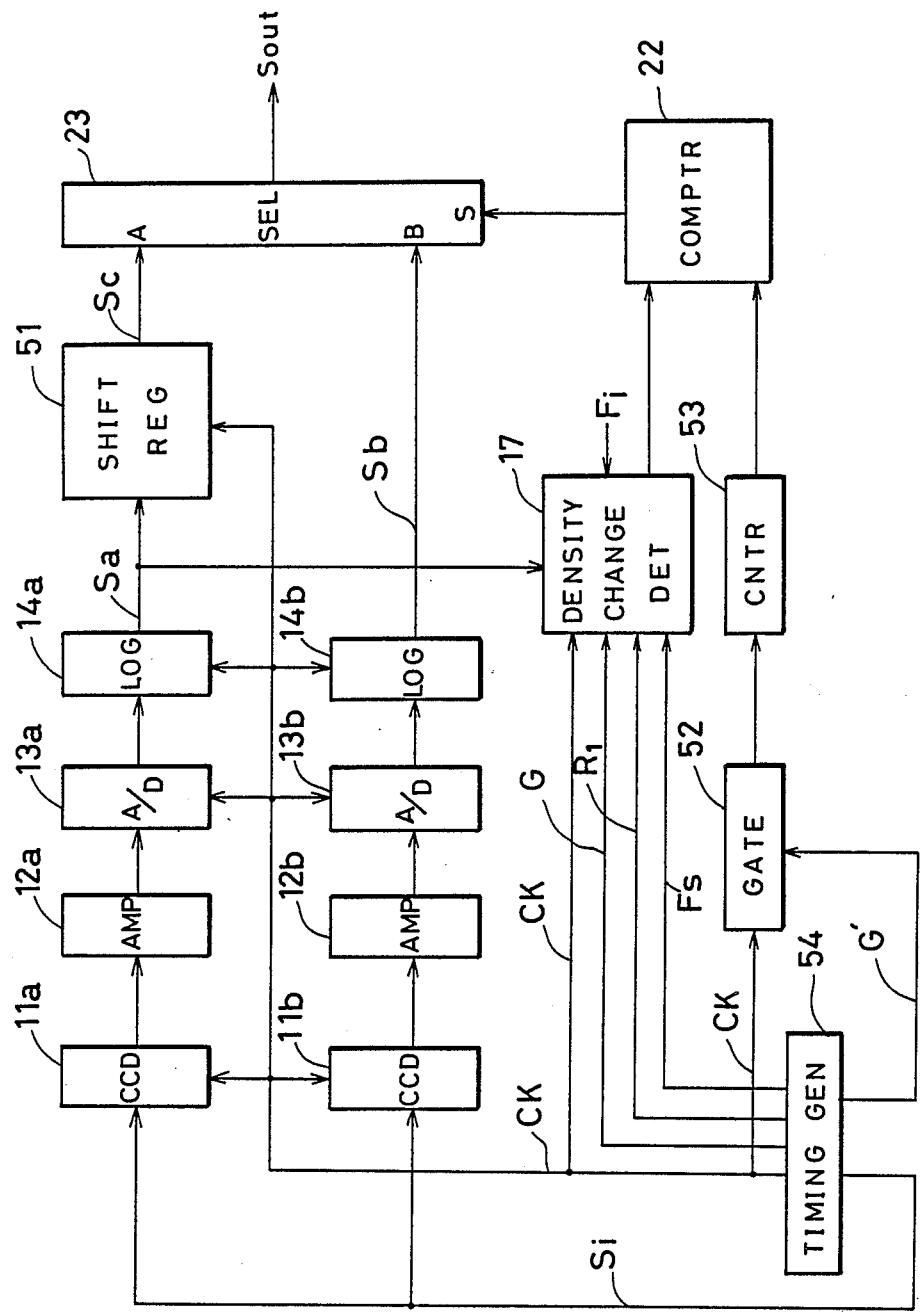
FIG. 12 is a block diagram showing the electric structure of a third embodiment of the present invention.

FIG. 12 illustrates a third embodiment of the present invention. In the third embodiment, line sensors 11a and 11b read the original in a time series manner. Image pickup signals Sa and Sb are not stored in memories, but one image pickup signal Sa is guided to a shift register 51. This signal Sa is delayed in the shift register 51 by a time for transferring an overlapping portion ΔR to be a delayed output Sc (FIG. 13(c)), thereby to match the timing for transfering the both signals with respect to the overlapping potion ΔR. Further, an image pickup signal from the overlapping portion ΔR included in the image pickup signal Sa is fetched in a density change detector 17, to specify switching pixels in intervals as shown at FIG. 13(g).

Figure 13:
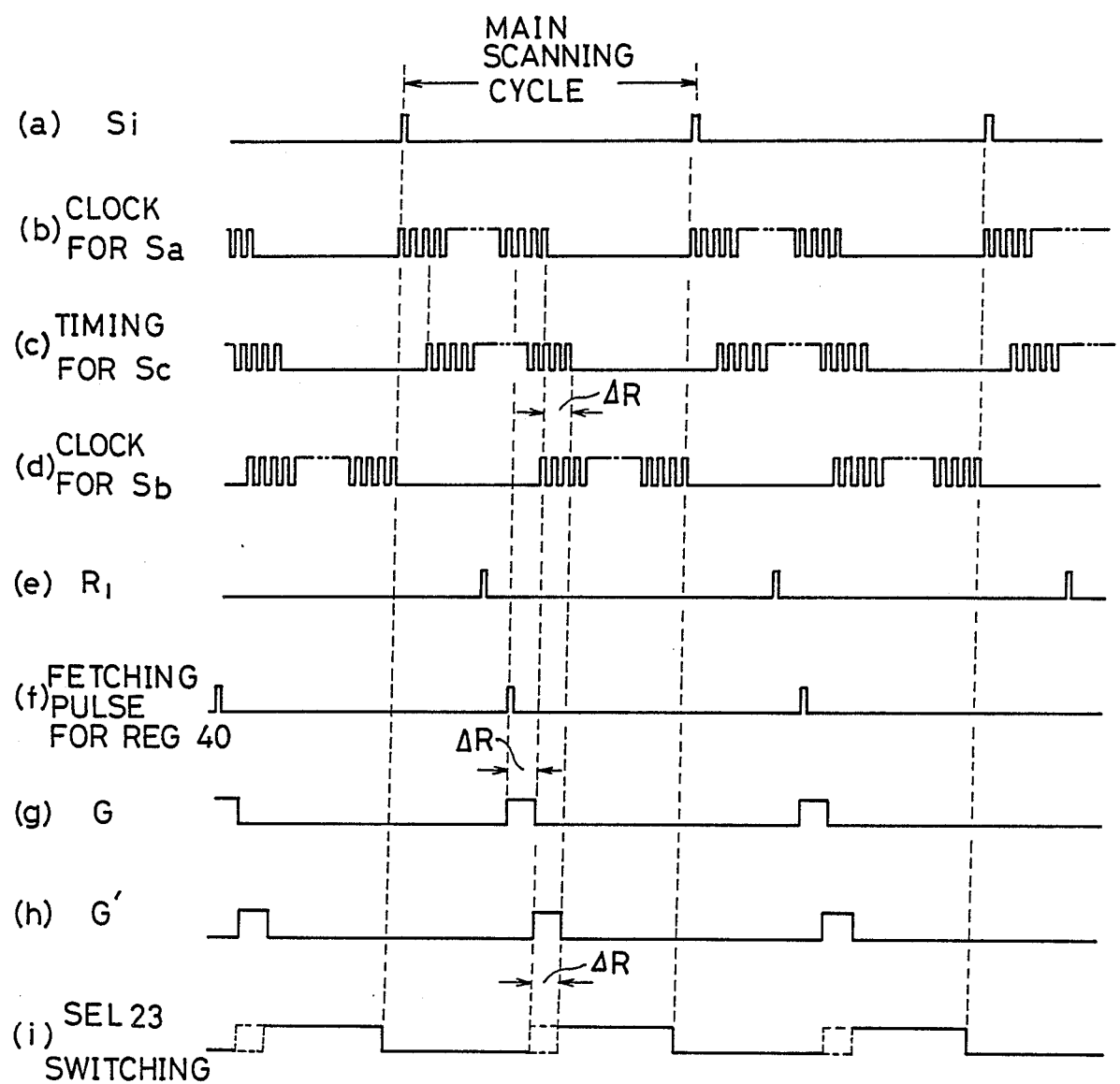
FIG. 13 is a timing chart showing the operation of the third embodiment.

Thereafter a gate ciruit 52 as shown in FIG. 12 is so driven on the basis of a gate signal G' that a counter 53 counter a clock signal CK (FIG. 13(d)) from a timing signal generator 54. Thus, recognized is the pixel number of a pixel transferred as the image pickup signal Sb at that time. Within the same main scanning cycle, a comparator 22 performs switching operation in an interval for reading the overlapping portion ΔR as ahown at FIG. 13(i), whereby connection is performed at the pixel having the minimum density change value as switching pixel.

The shift register 51 in this embodiment may have such capacity capable of holding the overlapping portion ΔR in the image pickup signal Sa. It is also possible to employ other delay means which can delay the image poickup signal Sa by a time lag required for transferring the overlapping portion ΔR. Although detection is made in the rear overlapping portion in the image pickup signal Sa in the aforementioned embodimet, such detection can be made in the front overlapping portion in the image pickup signal Sb, as a matter of course.

EFFECTS OF THE EMBODIMENTS

Figure 2:
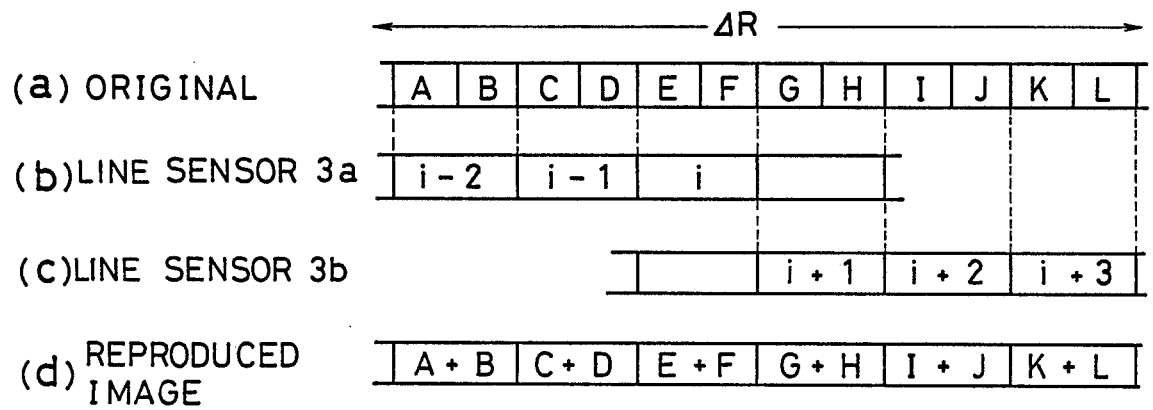
FIGS. 2 and 3 are diagrams showing overlapping relation in the split read system.
Figure 3:
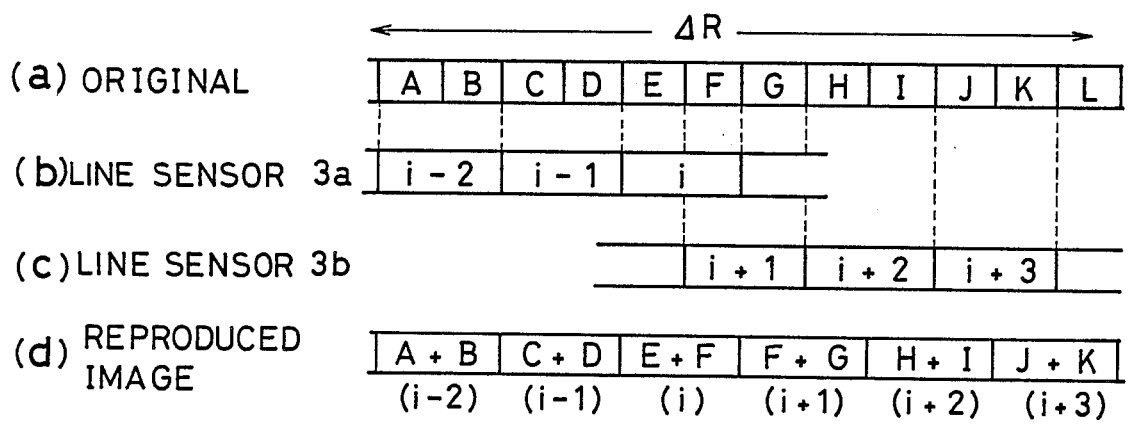
Figure 5:
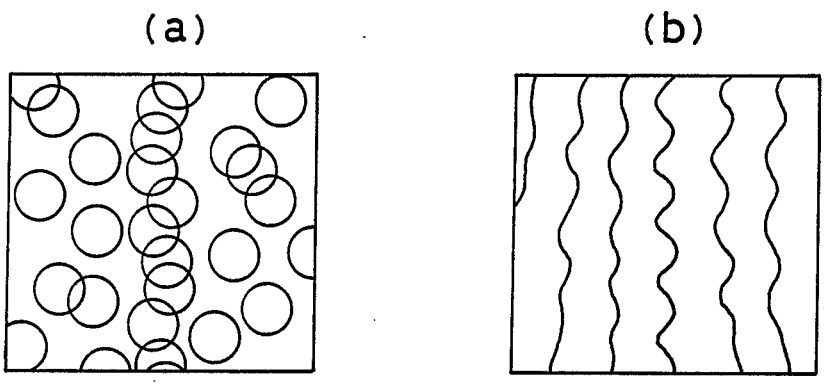
FIG. 5 is a diagram illustration originals to be read.
Figure 6:
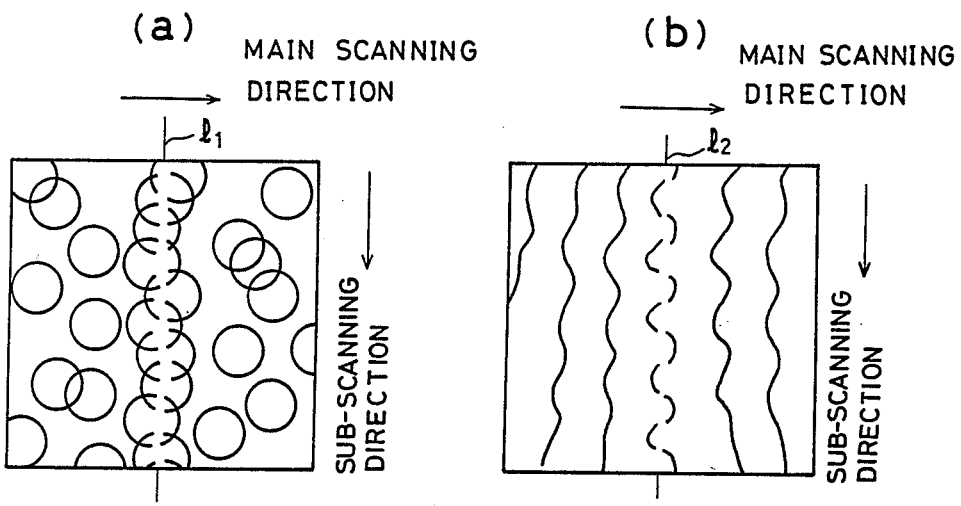
FIG. 6 is a diagram showing irregularity of reproduced image caused in conventional readers.
Figure 14:
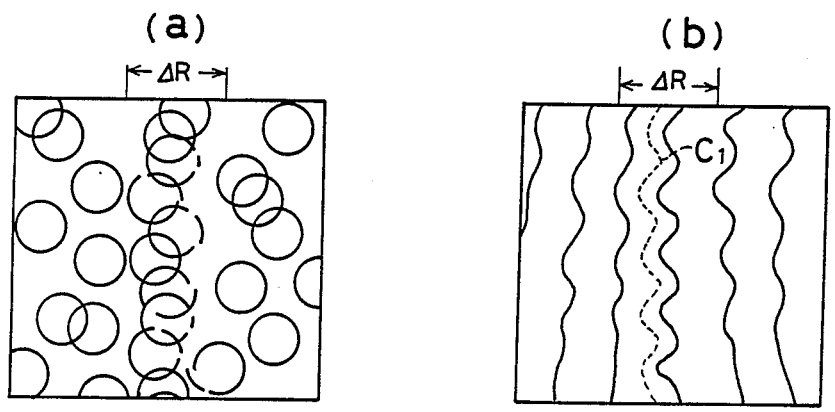
FIG. 14 is a diagram illustrating examples of image reproduced by the embodiment of the present invention.

FIG. 14 showns examples of reproduced images odtained by reading the images as shown in FIG. 5 on the basis of the embodiments as hereinabove described. Since positions of pixels having small density changes in the main scanning direction are varied with the main scanning lines, irregularity of the image is dispersed in the overlapping portion ΔR as obvious from FIG. 14(a). Thus, the irregularity of the reproduced image is hard to be visualized. It is proved in, e.g., "Optics" by Hiroshi Kubota, Iwanami Shoten, Tokyo, Japan 1964, from p. 351 that such irregularity is made inconspicuous when the same is not linearly arrayed.

In the case of FIG. 14(b), the pixels are switched along a curved line C₁, whereby irregularity of the image is hardly recognized. This is an example of the effect of switching the pixels in compliance with the characteristic of the original. Since no switching is performed in a proportional distribution manner, the border lines can be clearly reproduced.

MODIFICATIONS

The five-stage shift register 31 employed in the first embodiment may be provided in any number of stages, on condition that the same has two or more stages. For example, a two-stage shift register is adapted to detect the density change between two adjacent pixels.

According to the present invention, changes between adjacent pixels in the sub-scanning direction can also be deteced in addition to those in the main scanning direction, to process the pixels having small density changes as switching pixels.

The aforementioned respective embodiments can be carried out with wellknown image processing such as shading correction as a matter of course, although such processing is not described in this specification.

Although the present invention has been described and illustrated in detail, it is clearly understood that the same is by way of illustration and example only and is not to be taken by way of limitation, the spirit and scope of the present invention being limited only by the appended claims.

What is claimed is:

1. An image reader for reading image data of the original, said image reader comprising:
    a plurality of image pickup elements for reading said image data of said original, said elements reading partially overlapping image regions to provide image pickup signals;
    density change detecting means for detecting a pixel array having small spatial density changes with respect to that of adjacent pixels from among pixels located within an overlapping image region on the basis of said image pickup signals supplied from said image pickup elements and specifying the detected pixel as a switching pixel; and
    image pickup signal connecting means for connecting respective said image pickup signals supplied from said plurality of image pickup elements at said switching pixel and outputting the connected image signals to desired image processing system.

2. An image reader in accordance with claim 1, wherein
    said density change detecting means includes mutual comparison means for performing mutual comparison of density change values with respect to every image region containing a prescribed number of pixels and located within said overlapping image regions.

3. An image reader in accordance with claim 2, wherein
    said mutual comparison means is adapted to specify a minimum density change pixel having the minimum density change value in said overlapping image regions by said mutual comparison.

4. An image reader in accordance with claim 3, wherein
    said image reader further includes memory means for temporarily storing respective said image pickup signals supplied from said image pickup elements;
    said mutual comparison means is adapted to specify said minimum density change pixel by storage address in said memory means, and
    said image pickup signal connecting means includes a compartor for comparing reading addresses of said image signals read from said memory means with said storage address of said minimum density change pixel specified by said mutual comparison means and selector means for selectively switching said image pickup signals obtained from said plurality of image pickup elements and connecting the same in response to address matching outputs in said comparator.

5. An image reader in accordance with claim 1, wherein
    said density change detecting means includes reference value set means for setting a prescribed density change reference value and means for finding pixels having density values smaller than said density change reference value thereby to specify a pixel as said switching pixel.

6. An image reader in accordance with claim 1, wherein
    said image pickup elements are one-dimensional image pickup elements,
    said reading is performed by scanning said original,
    said connection is performed with respect to the main scanning direction.

* * * * *